US009045638B2

(12) United States Patent
Ko et al.

(10) Patent No.: US 9,045,638 B2
(45) **Date of Patent: *Jun. 2, 2015**

(54) CURABLE COMPOSITION

(71) Applicant: LG CHEM, LTD., Seoul (KR)

(72) Inventors: Min Jin Ko, Daejeon (KR); Myung Sun Moon, Daejeon (KR); Jae Ho Cheong, Daejeon (KR); Bum Gyu Choi, Daejeon (KR); Dae Ho Kang, Daejeon (KR); Min Kyoun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,313

(22) Filed: Nov. 4, 2013

(65) Prior Publication Data

US 2014/0128555 A1 May 8, 2014

Related U.S. Application Data

(63) Continuation of application No. PCT/KR2012/003542, filed on May 4, 2012.

(30) Foreign Application Priority Data

May 4, 2011 (KR) ........................ 10-2011-0042395
May 4, 2012 (KR) ........................ 10-2012-0047759

(51) Int. Cl.

| | |
|---|---|
| ***C08L 83/04*** | (2006.01) |
| ***G02F 1/1339*** | (2006.01) |
| *C08K 3/36* | (2006.01) |
| *C08G 77/12* | (2006.01) |
| *C08G 77/20* | (2006.01) |
| *C08K 5/5419* | (2006.01) |
| *C08G 77/00* | (2006.01) |

(52) U.S. Cl.

CPC ............... *C08L 83/04* (2013.01); *G02F 1/1339* (2013.01); *G02F 2001/13398* (2013.01); *C08K 3/36* (2013.01); *C08G 77/12* (2013.01); *C08G 77/20* (2013.01); *C08K 5/5419* (2013.01); *C08G 77/70* (2013.01)

(58) Field of Classification Search

None

See application file for complete search history.

(56) References Cited

U.S. PATENT DOCUMENTS

| | | | | |
|---|---|---|---|---|
| 5,530,075 | A * | 6/1996 | Morita et al. | 525/431 |
| 7,527,871 | B2 | 5/2009 | Morita et al. | |
| 8,080,614 | B2 * | 12/2011 | Morita et al. | 525/100 |
| 8,258,502 | B2 * | 9/2012 | Yoshitake et al. | 257/40 |
| 2002/0161140 | A1 * | 10/2002 | Yoneda et al. | 526/90 |
| 2004/0241927 | A1 * | 12/2004 | Kato et al. | 438/202 |
| 2005/0212008 | A1 * | 9/2005 | Miyoshi | 257/100 |
| 2006/0073347 | A1 * | 4/2006 | Morita et al. | 428/447 |
| 2006/0081864 | A1 * | 4/2006 | Nakazawa | 257/98 |
| 2007/0112147 | A1 * | 5/2007 | Morita et al. | 525/478 |
| 2009/0099321 | A1 * | 4/2009 | Yoshitake et al. | 525/475 |
| 2009/0118440 | A1 * | 5/2009 | Nakanishi et al. | 525/478 |
| 2009/0123764 | A1 * | 5/2009 | Morita et al. | 428/446 |
| 2011/0147955 | A1 * | 6/2011 | Kashiwagi | 257/791 |
| 2011/0160410 | A1 * | 6/2011 | Sagawa et al. | 525/478 |
| 2013/0009201 | A1 * | 1/2013 | Ko et al. | 257/100 |
| 2013/0187176 | A1 * | 7/2013 | Ko et al. | 257/88 |

FOREIGN PATENT DOCUMENTS

| | | | |
|---|---|---|---|
| JP | 11-274571 | A | 10/1999 |
| JP | 2001-196151 | A | 7/2001 |
| JP | 2002-226551 | A | 8/2002 |
| JP | 2009-173789 | A | 8/2009 |
| JP | 2009-185226 | A | 8/2009 |
| KR | 10-2007-0085392 | A | 8/2007 |
| KR | 10-2008-0104279 | A | 12/2008 |

OTHER PUBLICATIONS

International Search Report issued in International Application No. PCT/KR2012/003542 on Nov. 30, 2012, 2 pages.

Supplementary European Search Report issued in European Application No. 12 77 9994 on Nov. 19, 2014, 4 pages.

* cited by examiner

*Primary Examiner* — Robert S Loewe

(74) *Attorney, Agent, or Firm* — Rothwell, Figg, Ernst & Manbeck, P.C.

(57) ABSTRACT

Provided is a curable composition. The curable composition, which may provide an encapsulating material, of which processibility and workability before curing are effectively maintained and which has excellent light transmissivity, light extraction efficiency, hardness, crack resistance, adhesion strength and thermal shock resistance after curing, is provided. Further, the curable composition may show effectively controlled tackiness in the surface and may not show whitening under the high temperature or high humidity condition before or after curing.

19 Claims, No Drawings

CURABLE COMPOSITION

CROSS REFERENCE TO RELATED APPLICATIONS

The present application is a continuation application of International Application PCT/KR2012/003542, with an international filing date of May 4, 2012, which claims priority to and the benefit of Korean Patent Application No. 10-2011-0042395, filed May 4, 2011 and to Korean Patent Application No. 10-2012-00047759, filed May 4, 2012, the disclosure of which is incorporated herein by reference in their entireties.

BACKGROUND

1. Field of the Invention

The present invention relates to a curable composition.

2. Discussion of Related Art

High-brightness products have been obtained by using GaN compound semiconductors such as GaN, GaAlN, InGaN or InAlGaN as a light emitting diode (LED), for example, a blue or ultraviolet (UV) LED. Further, it becomes possible to form high-quality full color image by combining red and green LEDs with the blue LED. For example, a white LED prepared by using the blue or UV LED with phosphors is known. Demands of such LEDs has increased in the application of a backlight of a liquid crystal display (LCD) or a general light.

As an encapsulating material for an LED, an epoxy resin having a high adhesive property and excellent dynamic durability has been widely used. However, the epoxy resin has problems of low transmissivity with respect to light in a blue-to-UV region and low light resistance. Accordingly, for example, in the patent documents 1 to 3, techniques to improve such problems are suggested. However, encapsulating materials disclosed in the patent documents do not have sufficient light resistance.

As a material with excellent resistance to light having low wavelengths, a silicon resin is known. However, the silicon resin has low thermal resistance and tackness on a surface thereof after curing. Further, in order for the silicon resin to effectively function as the encapsulating material of the LED, it is necessary to ensure characteristics of high refraction, crack resistance, surface hardness, adhesive strength and thermal shock resistance.

PRIOR ART DOCUMENTS

Patent Documents

Patent document 1: Japanese Patent Laid-Open Publication No. H11-274571

Patent document 2: Japanese Patent Laid-Open Publication No. 2001-196151

Patent document 3: Japanese Patent Laid-Open Publication No. 2002-226551

SUMMARY OF THE INVENTION

An object of the present invention is to provide a curable composition.

Examples of the curable composition may include crosslinked polysiloxanes comprising an alkenyl group and a polysiloxane comprising a hydrogen atom that is bound to a silicon atom. In one embodiment, the crosslinked polysiloxane may include (A) a crosslinked polysiloxane represented by the average composition formula of Formula 1; and (B) a crosslinked polysiloxane represented by the average composition formula of Formula 2 as described below.

$$(R^1R^2R^3SiO_{1/2})_a(R^4R^5SiO_{2/2})_b(R^6SiO_{3/2})_c(SiO_{4/2})_d \quad \text{[Formula 1]}$$

$$(R^7R^8R^9SiO_{1/2})_e(R^{10}R^{11}SiO_{2/2})_f(R^{12}SiO_{3/2})_g(SiO_{4/2})_h \quad \text{[Formula 2]}$$

In Formulas 1 and 2, $R^1$ to $R^{12}$ are independently an alkoxy, a hydroxyl, an epoxy group or a monovalent hydrocarbon group, provided that at least one of $R^1$ to $R^6$ and at least one of $R^7$ to $R^{12}$ are alkenyl groups. In Formulas 1 and 2, (a+b)/(a+b+c+d) is 0.7 to 0.97, c/(c+d) is 0.8 or more, (e+f)/(e+f+g+h) is 0.2 to 0.7, g/(g+h) is 0.7 or more, c and d are not zero at the same time, and g and h are not zero at the same time.

In Formulas 1 and 2, if each of $R^1$ to $R^{12}$ is present in plural numbers, respectively, they may be the same as or different from each other.

Here, the (A) crosslinked polysiloxane represented by the average composition formula of Formula 1 may be simply referred to as an "(A) component," the (B) crosslinked polysiloxane represented by the average composition formula of Formula 2 may be simply referred to as a "(B) component," and the polysiloxane comprising at least one hydrogen atom bound to the silicon atom may be simply referred to as a "(C) component."

The term "M unit" as used herein may refer to a so-called monofunctional siloxane unit which is conventionally represented by $(R_3SiO_{1/2})$, the term "D unit" as used herein may refer to a so-called bifunctional siloxane unit which is conventionally represented as $(R_2SiO_{2/2})$, the term "T unit" as used herein may refer to a so-called trifunctional siloxane unit which is conventionally represented as $(RSiO_{3/2})$, and the term "Q unit" as used herein may refer to a so-called tetrafunctional siloxane unit which is conventionally represented as $(SiO_{4/2})$. The R's may be independently hydrogen atom, an alkoxy group, a hydroxyl group, an epoxy group or a monovalent hydrocarbon group.

Unless defined otherwise, the case where an average composition formula of a certain compound or a certain polysiloxane is represented by a certain chemical formula may include the case where the certain compound or the certain polysiloxane is a single component represented by the certain chemical formula and the case where the certain compound or the certain polysiloxae includes a plurality of components, and an average of the composition of the plurality of components is represented by the certain chemical formula.

The composition may be cured by a reaction of the alkenyl groups bound to the silicon atoms in the (A) and (B) components with the hydrogen atom bound to the silicon atom in the (C) component.

The (A) component is the crosslinked polysiloxane. The term "crosslinked polysiloxane" as used herein may refer to a polysiloxane that includes at least one T unit or at least one Q unit.

In the average composition formula of Formula 1, $R^1$ to $R^6$ are substituents directly bound to the silicon atom of polysiloxane, and independently an alkoxy group, a hydroxyl group, an epoxy group or a monovalent hydrocarbon group. At least one of $R^1$ to $R^6$ may be an alkenyl group.

The term "monovalent hydrocarbon group" as used herein, unless particularly defined otherwise, may refer to a monovalent substituent derived from an organic compound consisting of carbon atom and hydrogen atom, or a derivative of the organic compound. The monovalent hydrocarbon group may include at least one carbon atom, two or more carbon atoms, or 2 to 25 carbon atoms. Examples of the monovalent hydrocarbon group may include an alkyl group, an alkenyl group and an aryl group.

The term "alkoxy group" as used herein, unless particularly defined otherwise, may refer to an alkoxy group including 1 to 20, 1 to 16, 1 to 12, 1 to 8 or 1 to 4 carbon atom(s). The alkoxy group may be a linear, branched or cyclic alkoxy group. The alkoxy group may be optionally substituted with at least one substituent, if necessary. Examples of the alkoxy group may include a methoxy, ethoxy and propoxy group.

The term "alkyl group" as used herein, unless particularly defined otherwise, may refer to a linear, branched or cyclic alkyl group having 1 to 20, 1 to 16, 1 to 12, 1 to 8 or 1 to 4 carbon atom(s). The alkyl group may be optionally substituted with at least one substituent. Examples of the alkyl group may include a methyl, ethyl, propyl, chloromethyl, 3-chloropropyl and 3,3,3-trifluoropropyl group.

The term "alkenyl group" as used herein, unless particularly defined otherwise, may refer to an alkenyl group having 2 to 20, 2 to 16, 2 to 12, 2 to 8 or 2 to 4 carbon atom(s). The alkenyl group may be a linear, branched or cyclic alkenyl group. The alkenyl group may be optionally substituted with at least one substituent. Examples of the alkenyl group may include a vinyl, allyl, butenyl, pentenyl and hexenyl group.

The term "aryl group" as used herein, unless particularly defined otherwise, may refer to a monovalent substituent derived from a compound including at least one benzene ring or a compound including a structure formed by at least two connected or condensed benzene rings, or a derivative thereof. That is, the scope of the aryl group may also include a substituent referred to as a so-called aralkyl or arylalkyl group in the field as well as the substituent conventionally referred to as an aryl group in the field. For example, the aryl group may be an aryl group having 6 to 25, 6 to 21, 6 to 18 or 6 to 13 carbon atoms. Examples of the aryl group may include a phenyl, dichlorophenyl, chlorophenyl, phenylethyl, phenylpropyl, benzyl, tolyl, xylyl and naphthyl group.

The term "epoxy group" as used herein, unless particularly defined otherwise, may refer to a monovalent substituent derived from a cyclic ether compound having three ring-membered atoms or a compound including the cyclic ether compound. Examples of the epoxy group may include a glycidyl, epoxyalkyl, glycidoxyalkyl and alicyclic epoxy group.

In the above, illustrative substituents, with which the alkoxy group, epoxy group or monovalent hydrocarbon group may be optionally substituted, may be halogen atoms such as fluorine, chlorine or bromine, an epoxy group, an acryloyl group, a methacryloyl group, an isocyanate group, a thiol group or the monovalent hydrocarbon group as described above, but are not limited thereto.

In Formula 1, at least one of $R^1$ to $R^6$ may be an alkenyl group. The alkenyl group may be included in such an amount that a molar ratio (Ak/Si) of the alkenyl group (Ak) with respect to the total silicon atoms (Si) in the (A) component may be in the range from 0.02 to 0.2 or from 0.02 to 0.15. If the molar ratio (Ak/Si) is 0.02 or more, suitable reactivity of the (A) component to the (C) component may be maintained, and a phenomenon in which un-reacted components exudes from a surface of a cured product may be prevented. Further, if the molar ratio (Ak/Si) is 0.2 or less, an excellent crack resistance of the cured product may be maintained.

The (A) component may be a polysiloxane including an aryl group, specifically, an aryl group bound to the silicon atom. In this case, in Formula 1, at least one of $R^1$ to $R^6$ may be an aryl group, for example, a phenyl group. If the (A) component includes an aryl group, a molar ratio (Ar/Si) of total aryl group(s) in the (A) component with respect to the total silicon atom(s) (Si) in the (A) component may be in the range from 0.4 to 1.3 or from 0.5 to 1.2. If the molar ratio of the aryl group in the (A) component is controlled within the above-mentioned ratio, a curable composition may have excellent processibility and workability before curing and provide a cured product having excellent hardness and light extraction efficiency after curing.

The aryl group of the (A) component, for example, may be included in the D unit or T unit of the (A) component. In one embodiment, the (A) component may include at least one siloxane unit selected from the group consisting of a $(R^{13}R^{14}SiO_{2/2})$ unit, a $(R^{14}_2SiO_{2/2})$ unit and a $(R^{14}SiO_{3/2})$ unit. In the above, $R^{13}$ may be an alkyl group, for example, a methyl group, and $R^{14}$ may be an aryl group, for example, a phenyl group. In one embodiment, the (A) component may include at least the $(R^{14}_2SiO_{2/2})$ unit, and may additionally include an $(R^{13}_2SiO_{2/2})$ unit (herein, le may be the alkyl group).

In the average composition formula of Formula 1, the a, b, c and d represent respectively mole fractions of the siloxane units. If the sum of the a to d is converted into 1, the "a" may be in the range from 0 to 0.5, the "b" may be in the range from 0.5 to 0.98, the "c" may be in the range from 0 to 0.2, and the "d" may be in the range from 0 to 0.1. In Formula 1, the "c" and "d" may not be 0 simultaneously.

The "a," "b," "c" and "d" may be controlled within such a range that (a+b)/(a+b+c+d) may be from 0.7 to 0.97, from 0.71 to 0.97 or from 0.75 to 0.97, and c/(c+d) may be 0.8 or more or 0.9 or more. As ratios of the M, D, T and Q units of the (A) component are controlled within the above-described ranges, a cured product having desired physical properties may be obtained. The upper limit of c/(c+d) is not particularly limited, and may be controlled within the range of 1 or less.

The (A) component may have viscosity in the range from 500 cP to 100,000 cP or from 1,000 cP to 50,000 cP at 25° C. In this range, the composition may maintain excellent processibility and workability before curing and provide excellent hardness after curing.

Further, the (A) component may have a weight average molecular weight ($M_w$) in the range from 1,000 to 50,000 or from 1,000 to 30,000. If the weight average molecular weight of the (A) component is controlled to 1,000 or more, a composition whose viscosity is suitably maintained, and which has excellent hardness and crack resistance after curing may be provided. Further, if the weight average molecular weight is controlled to 50,000 or less, the viscosity of the composition may be suitably maintained, and thus excellent workability and processibility may be maintained. The term "weight average molecular weight" as used herein may refer to a conversion value with respect to the standard polystyrene, which is measured by the gel permeation chromatograph (GPC). Further, unless particularly defined otherwise, the term "molecular weight" as used herein may refer to the weight average molecular weight.

In one embodiment, the (A) component may be a reaction product, for example, a ring-opening polymerized product, of a mixture comprising a compound of Formula 3 and a cyclic siloxane compound of Formula 4.

[Formula 3]

$$(R^aR^b_2Si)_2O$$

[Formula 4]

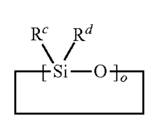

In Formulas 3 and 4, $R^a$ to $R^d$ are independently an alkoxy group, a hydroxyl group, an epoxy group or monovalent hydrocarbon group, provided that at least one of $R^a$ to $R^d$ is an alkenyl group, and o is in the range from 3 to 6.

If the (A) component is prepared by the reaction of the mixture, a polysiloxane having a desired structure and a sufficiently large molecular weight may be synthesized.

Ratios of the compounds of Formulas 3 and 4 in the mixture or specific kinds of $R^a$ to $R^d$ in Formulas 3 and 4 are not particularly limited, and may be selected in consideration of synthesis probability of a desired polysiloxane, for example, the polysiloxane having the average composition formula represented by Formula 1.

The mixture may further include a polysiloxane having a cage structure or partial cage structure as a component for forming a crosslinked structure.

For example, the mixture may further include a polysiloxane represented by one of average composition formulas of Formulas 5 to 7.

$$(SiO_2) \qquad \text{[Formula 5]}$$

$$[R^eSiO_{3/2}] \qquad \text{[Formula 6]}$$

$$[R^aR^b{}_sSiO_{1/2}]_p[R^eSiO_{3/2}]_q \qquad \text{[Formula 7]}$$

In Formulas 6 and 7, $R^a$, $R^b$ and $R^e$ are independently an alkoxy group, a hydroxyl group, an epoxy group or a monovalent hydrocarbon group, p is in the range from 1 to 2, and q is in the range from 3 to 10.

Ratios of the compounds of Formulas 5, 6 and 7 in the mixture or specific kinds of $R^a$, $R^b$ and $R^e$ in the Formulas 5 to 7 are not particularly limited, and may be selected in consideration of synthesis probability of a desired polysiloxane, for example, the polysiloxane having the average composition formula represented by Formula 1.

The reaction of the mixture, for example, may be performed in the presence of a catalyst. As a catalyst, for example, a base catalyst may be used. Examples of suitable base catalysts may include, but are not limited to, metal hydroxides such as KOH, NaOH and CsOH, metal silanolate comprising an alkali metal compound and siloxane, or quaternary ammonium compounds such as tetramethylammonium hydroxide, tetraethylammonium hydroxide or tetrapropylammonium hydroxide.

An amount of the catalyst used may be suitably selected in consideration of desired reactivity. In one embodiment, the catalyst may be used in a ratio of 0.01 to 30, 0.01 to 25, 0.01 to 20, 0.01 to 15, 0.01 to 10 or 0.03 to 5 parts by weight with respect to 100 parts by weight of the mixture, but is not limited thereto. Unless particularly defined otherwise, the unit "parts by weight" as used herein may refer to a weight ratio between components.

The reaction of the mixture may be performed as a neat reaction, or, if necessary, may be performed in suitable solvent. Any solvent, in which components such as the mixture and the catalyst may be suitably mixed, and which does not have a substantial effect on reactivity, may be used. Examples of the solvent may include, but are not limited to, an aliphatic hydrocarbon solvent such as n-pentane, i-pentane, n-hexane, i-hexane, 2,2,4-trimethylpentane, cyclohexane or methylcyclohexane; an aromatic solvent such as benzene, toluene, xylene, trimethylbenzene, ethyl benzene or methylethyl benzene, a ketone solvent such as methylethylketone, methylisobutyl ketone, diethylketone, methyl n-propyl ketone, methyl n-butyl ketone, cyclohexanone, methylcyclohexanone or acetylacetone, an ether solvent such as tetrahydrofuran, 2-methyl tetrahydrofuran, ethyl ether, n-propyl ether, isopropyl ether, diglyim, dioxine, dimethyl dioxine, ethyleneglycol monomethylether, ethyleneglycol dimethyl ether, ethyleneglycoldiethyl ether, propyleneglycol monomethylether or propyleneglycol dimethylether, an ester solvent such as diethyl carbonate, methyl acetate, ethyl acetate, ethyl lactate, ethyleneglycol monomethylether acetate, propyleneglycol monomethyletheracetate or ethyleneglycoldiacetate, and an amide solvent such as N-methylpyrrolidone, formamide, N-methyl foramide, N-ethyl foramide, N,N-dimethyl acetate or N,N-diethylacetamide.

The reaction of the mixture may be performed by, if necessary, adding the catalyst. In the above, reaction temperature may be within the range from 0° C. to 150° C. or from 30° C. to 130° C. Further, reaction time may be controlled within the range from 1 to 72 hours, but is not limited thereto.

The (B) component is crosslinked polysiloxane represented by the average composition formula of Formula 2. In Formula 2, $R^7$ to $R'^2$ are substituents directly bound to the silicon atom, and independently an alkoxy group, a hydroxyl group, an epoxy group or a monovalent hydrocarbon group.

In Formula 2, at least one of $R^7$ to $R'^2$ may be an alkenyl group. The alkenyl group may be included in such an amount that a molar ratio (Ak/Si) of the alkenyl group (Ak) with respect to the total silicon atoms (Si) in the (B) component may be in the range from 0.05 to 0.35 or from 0.1 to 0.3. If the molar ratio (Ak/Si) is controlled to 0.05 or more, suitable reactivity of the (B) component to the (C) component is maintained, and a phenomenon in which an un-reacted component exudes from a surface of a cured product may be prevented. Further, if the molar ratio (Ak/Si) is controlled to 0.35 or less, excellent strength, crack resistance, thermal shock resistance and crack resistance of the cured product may be maintained.

The (B) component may be a polysiloxane including an aryl group, for example, an aryl group bound to the silicon atom, and in this case, at least one of $R^7$ to $R^{12}$ in Formula 2 may be an aryl group, for example, a phenyl group. If the (B) component includes an aryl group, a molar ratio (Ar/Si) of the total aryl group(s) in the (B) component with respect to the total silicon atom(s) (Si) in the (B) component may be in the range from 0.4 to 1.3 or from 0.5 to 1.1. If the molar ratio of the aryl group is controlled within the above-mentioned range, a curable composition may have excellent processibility and workability before curing and provide a cured product having excellent hardness and light extraction efficiency after curing.

If the (B) component includes an aryl group, the aryl group may be a phenyl group. Further, the aryl group may be included in the D unit or T unit of the (B) component. For example, the (B) component may include at least one siloxane unit selected from the group consisting of a $(R^{13}R^{14}SiO_{2/2})$ unit, a $(R^{14}{}_2SiO_{2/2})$ unit and a $(R^{14}SiO_{3/2})$ unit. In the above, the "$R^{13}$" is an alkyl group, for example, a methyl group, and the "$R^{14}$" is an aryl group, for example, a phenyl group.

In the average composition formula of Formula 2, the "e," "f," "g" and "h" represent mole fractions of the siloxane units, respectively. If the sum of the "e" to "h" is converted into 1, the "e" may be in the range from 0 to 0.5, the "f" may be in the range from 0 to 0.3, the "g" may be in the range from 0.3 to 0.85, and the "h" may be in the range from 0 to 0.2. In the above, the "g" and "h" may not be 0 simultaneously.

The (B) component is the crosslinked polysiloxane, and ratios of M, D, T and Q units forming the crosslinked polysiloxane are controlled. For example, in Formula 2, (e+f)/(e+f+g+h) may be in the range from 0.2 to 0.7, from 0.2 to 0.5 or from 0.2 to 0.4. Further, g/(g+h) may be in the range of 0.7 or more or 0.8 or more. The upper limit of the g/(g+h) may be 1.

If the ratios of the siloxane units in the (B) component are controlled as described above, a cured product having excellent strength, crack resistance and thermal shock resistance may be provided.

The (B) component may have a viscosity in the range of 5,000 cP or more or of 10,000 cP or more at 25° C. In this range, the composition may maintain excellent processibility or workability before curing, and an excellent hardness characteristic after curing.

Further, the (B) component may have the molecular weight in the range from 1,000 to 20,000 or from 1,000 to 10,000. If the molecular weight is controlled to 1,000 or more, a composition may have a viscosity, which is suitably maintained, and provide excellent strength and crack resistance after curing. Further, if the molecular weight is controlled to 20,000 or less, the viscosity of the composition is suitably maintained, and thus the composition may have excellent workability and processibility.

The (B) component may be included in the composition in an amount of 20 to 700 parts by weight or 50 to 600 parts by weight, relative to 100 parts by weight of the (A) component. Accordingly, the composition may have excellent processibility and workability before curing, and provide hardness, crack resistance and thermal shock resistance after curing. Further, if the content of the (B) component is controlled as described above, a cured product, in which whitening is not caused under a high temperature or high humidity condition after curing and which may have an effectively controlled tackiness in the surface, may be provided.

The composition includes a polysiloxane having at least one hydrogen atom(s) bound to the silicon atom as the (C) component.

The (C) component, for example, the polysiloxane may include a hydrogen atom that is bound to the silicon atom that is positioned in the terminal end of the polysiloxane, and, in some cases, the (C) component may include a hydrogen atom positioned at a side chain of the polysiloxane. However, it is preferable that a hydrogen atom is bound at least to the terminal end of the polysiloxane. A molar ratio (H/Si) of the total hydrogen atom(s) (H) bound to the silicon atom(s) in the (C) component with respect to the total silicon atoms (Si) in the (C) component may be in the range from 0.2 to 0.8 or from 0.3 to 0.75. If the molar ratio is controlled as described above, a composition having excellent curability and physical properties before and after curing may be provided.

The (C) component may be a polysiloxane including an aryl group, for example, an aryl group bound to a silicon atom, and the aryl group may be a phenyl group. If the (C) component includes an aryl group, a molar ratio (Ar/Si) of the total aryl group(s) in the (C) component with respect to the total silicon atom(s) (Si) in the (C) component may be in the range from 0.3 to 1.2 or from 0.5 to 1.1. If the molar ratio of the aryl group is controlled as described above, a curable composition may have excellent processibility and workability before curing and provide excellent hardness, thermal shock resistance, crack resistance and light extraction efficiency after curing.

Further, the (C) component may have the molecular weight of less than 1,000 or less than 800. If the molecular weight is controlled as described above, a composition having excellent hardness after curing may be provided. Further, the lower limit of the molecular weight of the (C) component is not particularly limited, and thus may be controlled within a range of, for example, 250 or more.

Moreover, the (C) component may have a viscosity in the range of 500 cP or less at 25° C., and therefore a composition having excellent workability and processibiltiy may be provided.

In one embodiment, the (C) component as described above may be represented by Formula 8.

[Formula 8]

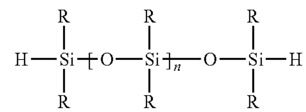

In Formula 8, Rs are independently a hydrogen atom, an epoxy group or a monovalent hydrocarbon group, and n is in the range from 1 to 10.

In another embodiment, in Formula 8, n may be in the range from 1 to 5, and at least one of Rs may be an aryl group, and preferably, a phenyl group.

The (C) component may be a compound represented by one of the following Formulas, but not limited thereto:

$(HMe_2SiO_{1/2})_2(MePhSiO_{2/2})_2$;

$(HMe_2SiO_{1/2})_2(HMeSiO_{2/2})(MePhSiO_{2/2})_2$;

$(HMe_2SiO_{1/2})_2(Ph_2SiO_{2/2})_{1.5}$;

$(HMe_2SiO_{1/2})_2(HMeSiO_{2/2})(Ph_2SiO_{2/2})_{1.5}$;

$(HMe_2SiO_{1/2})_2(PhMeSiO_{2/2})_{1.5}(Ph_2SiO_{2/2})_{1.5}$;

$(HMe_2SiO_{1/2})_2(Me_2SiO_{2/2})_{2.5}(Ph_2SiO_{2/2})_{2.5}$;

$(HMe_2SiO_{1/2})_2(Me_2SiO_{2/2})_3(Ph_2SiO_{2/2})_5$; and $(HMe_2SiO_{1/2})_2(HMeSiO_{2/2})(Ph_2SiO_{2/2})_2$.

In the above, the "Vi" represents a vinyl group, the "Me" represents a methyl group, and the "Ph" represents a phenyl group.

A ratio of the (C) component is not particularly limited, and may be controlled in consideration of curability. The (C) component may be included in a composition in such an amount that a molar ratio (H/Ak) of the hydrogen atom bound to the silicon atom in the (C) component with respect to the total alkenyl groups (Ak) in the (A) and (B) components may be in the range from 0.7 to 1.3 or from 0.75 to 1.25.

The (A), (B) and (C) components in the composition may include at least one aryl group, for example, a phenyl group, as described above. In this case, the molar ratio (Ar/Si) of the total aryl groups (Ar) in the (A), (B) and (C) components with respect to the total silicon atoms (Si) in these components may be in the range of more than 0.3 or from 0.4 to 1.2. In this range, a composition in which viscosity and processibility are suitably maintained before curing, hardness, refractive index, thermal shock resistance and crack resistance are excellent after curing, and a surface adhesive property is suitably controlled, may be provided.

In the composition, in consideration of a refractive index and a hardness characteristic of a cured product, each of the (A), (B) and (C) components may include an aryl group, for example, a phenyl group, which is bound to the silicon atom.

Further, if each of the (A), (B) and (C) components includes an aryl group, each component may satisfy the requirements of Expressions 1 and 2.

$$|X_{(A)}-X_{(B)}|<0.5 \quad \text{[Expression 1]}$$

$$|X_{(B)}-X_{(c)}|<0.5 \quad \text{[Expression 2]}$$

In Expressions 1 and 2, the $X_{(A)}$ is a molar ratio (Ar/Si) of the total aryl group(s) (Ar) in the (A) component with respect to the total silicon atoms (Si) in the (A) component, the $X_{(B)}$ is a molar ratio (Ar/Si) of the total aryl group(s) (Ar) groups in the (B) component with respect to the total silicon atoms (Si) in the (B) component, and the $X_{(c)}$ is a molar ratio (Ar/Si) of the total aryl group(s) (Ar) in the (C) component with respect to the total silicon atoms (Si) in the (C) component.

In another embodiment, in Expressions 1 and 2, $|X_{(A)}-X_{(B)}|$ and $|X_{(B)}-X_{(C)}|$, that is, an absolute value of a difference between $X_{(A)}$ and $X_{(B)}$ and an absolute value of a difference between $X_{(B)}$ and $X_{(c)}$, may be less than 0.4 or less than 0.35 respectively, and the lower limit of the respective values are not particularly limited.

If the amount of the aryl groups is controlled so as to satisfy the requirements of Expressions 1 and 2, compatibility of components constituting a composition may be excellently maintained, and a composition, which has excellent processibility or workability, and shows excellent transparency, refractive index, light extraction efficiency, strength, crack resistance and thermal shock resistance after curing, may be provided.

A method of preparing polysiloxanes of the (B) and (C) components is not particularly limited. In this field, polysiloxanes according to the intended composition formula or various methods capable of preparing the intended polysiloxanes are known. For example, the polysiloxane may be prepared by hydrolyzing and/or condensing organosilane having a hydrolysable functional group such as —Cl, —$OCH_3$, —$OC(O)CH_3$, —$N(CH_3)_2$, —$NHCOCH_3$ or —$SCH_3$, and the process may be carried out in the presence of a conventional acid or base catalyst. The organosilane used in hydrolysis and condensation may be, for example, a compound represented as $R_nSiX_{(4-n)}$. In the above, the "X" may be a hydrolysable functional group, for example, a halogen atom or an alkoxy group, and n may be 0, 1, 2 or 3. Further, the "R" may be a substituent bound to the silicon atom, which may be selected according to the intended polysiloxane.

The polysiloxane may be prepared by ring-opening polymerization of a suitable cyclic polysiloxane in the presence of a base catalyst. In the field of preparing polysiloxane, various methods of preparing polysiloxane, other than the condensation or ring-opening polymerization, are known, and a person skilled in the art may employ suitable materials and reaction conditions depending on the intended polysiloxane or composition of polysiloxane.

The composition may further include a catalyst for an addition-curing reaction. The catalyst may catalyze a reaction of the alkenyl group in the (A) and (B) components and the hydrogen atom bound to the silicon atom in the (C) component. The kind of the catalyst for the addition-curing reaction is not particularly limited, and thus all conventional components known in the art may be used. Examples of the catalyst may include platinum, palladium and rhodium catalysts. In one embodiment, in consideration of catalyst efficiency, a platinum catalyst may be used, and include, but are not limited to, chloroplatinic acid, platinum tetrachloride, an olefin complex of platinum, an alkenyl siloxane complex of platinum and a carbonyl complex of platinum.

An amount of the catalyst for the addition-curing reaction is not particularly limited as long as the catalyst is included in an effective amount capable of acting as a catalyst. Conventionally, the amount of the catalyst for the addition reaction may be 0.1 to 500 ppm, and preferably, 0.2 to 100 ppm based on an atomic weight (based on mass) of platinum, palladium or rhodium, but is not limited thereto.

The composition may further include a tackifier in order to enhance the adhesion strength to various substrates. The tackifier may improve the adhesion property of the curable composition or the cured product thereof, particularly, the adhesion property with respect to metals and organic resins.

The tackifier may be, but is not limited to, silane having at least one, preferably at least two functional groups selected from the group consisting of alkenyl such as vinyl, (meth) acryloyloxy, hydrosilyl (—SiH), epoxy, alkoxy, alkoxy silyl, carbonyl and phenyl; or an organic silicon compound such as cyclic or linear siloxane having 2 to 30, preferably 4 to 20 silicon atoms. One or a mixture of at least two of the tackifiers may be used.

If the composition includes a tackifier, an amount of the tackifier may be in the range from 0.1 to 20 parts by weight with respect to 100 parts by weight of the (A) component, but may be suitably changed in consideration of an effect of improving a desired adhesive property.

If necessary, the curable composition may further include one or at least two of a reaction inhibitor such as 3-butyne-2-ol, 2-phenyl-3-1-butyne-2-ol, 3-methyl-3-pentene-1-in, 3,5-dimethyl-3-hexene-1-in, 1,3,5,7-tetramethyl-1,3,5,7-tetrahexenylcyclotetrasiloxane or ethynylcyclohexane; an inorganic filler such as silica, alumina, zirconia or titania; metal powder such as silver, copper or aluminum; a conducting reagent such as various carbon materials; and a color tone adjuster such as a pigment or dye.

The present application also relates to a semiconductor device that includes a semiconductor element encapsulated by an encapsulating material including the curable composition in the cured state.

In the above, the cured state may include a state in which the curable composition is simply dried or a state in which the curable composition is partially or completely cured.

The semiconductor devices may include a diode, a transistor, a thyristor, a solid-phase image pick-up device, and a semiconductor device used in an integrated IC or hybrid IC. Further, the semiconductor device may be a diode, a transistor, a thyristor, a photocoupler, a CCD, an integrated IC, a hybrid IC, LSI, VLSI or a light emitting diode (LED).

The semiconductor unit may be a light emitting device including a light emitting diode encapsulated with the encapsulating material including the curable composition in the cured state.

The light emitting diode is not particularly limited. For example, the light emitting diode may be formed by stacking a semiconductor material on a substrate. In this case, the semiconductor material may be, but is not limited to, GaAs, GaP, GaAlAs, GaAsP, AlGaInP, GaN, InN, AlN, InGaAlN or SiC. Further, the substrate may be formed of sapphire, spinel, SiC, Si, ZnO or GaN single crystal.

Further, if necessary, a buffer layer may be formed between the substrate and the semiconductor material. Here, the buffer layer may be formed of GaN or AlN. A method of stacking the semiconductor material on the substrate may be, but is not limited to, MOCVD, HDVPE, or liquid phase growth. Further, a structure of the light emitting device may be mono junction such as MIS junction, PN junction or PIN junction, hetero junction or double hetero junction. Further, the light emitting device may be formed in a single or multiple quantum well structure.

In one embodiment, an emission wavelength of the light emitting device may be 250 to 550 nm, 300 to 500 nm or 330 to 470 nm. Here, the emission wavelength is a main emission peak wavelength. As the emission wavelength of the light emitting device is set in the above-mentioned range, a white light emitting diode having a longer lifespan, high energy efficiency and a high color reproduction characteristic may be obtained.

The light emitting device may be manufactured by encapsulating a light emitting diode, particularly, having an emission wavelength of 250 to 550 nm with the curable composition. In this case, the encapsulation of the light emitting diode may be done with the composition according to the present invention alone, or when necessary, in combination with another encapsulating material. When two kinds of encapsulating materials are used together, the light emitting diode may be first encapsulated with the composition, and then encapsulated with another encapsulating material, or the light emitting diode may be first encapsulated with another encapsulating material, and then encapsulated with the composition. The other encapsulating material may be an epoxy resin, a silicon resin, an acryl resin, a urea resin, an imide resin or glass.

As a method of encapsulating the light emitting diode with the composition, for example, a method of previously putting a thermosetting composition in a mold-type cast, immersing a lead frame to which a light emitting diode is fixed thereto, and curing the composition, or a method of putting a curable composition in a cast into which a light emitting diode is inserted and curing the composition may be used. Here, a method of putting the curable composition may be putting by a dispenser, transfer-molding or injection molding. Further, other than the above-described encapsulating method, a method of dropping a curable composition on a light emitting diode, coating the composition thereon by screen printing or stencil printing or via a mask, and curing the composition, or a method of putting a curable composition in a cup having a light emitting diode at a lower portion thereof using a dispenser and curing the composition may be used. The curable composition may also be used as a die-bonding agent fixing a light emitting diode to a lead terminal or a package, a passivation layer disposed on a light emitting diode, or a package substrate.

Here, a method of curing the composition is not particularly limited. For example, the composition may be cured by applying heat at 60° C. to 200° C. for 10 minutes to 5 hours, or when necessary, through an at least two-step sequential curing process executed at suitable temperature and time.

A shape of an encapsulated part is not particularly limited, and may be a bullet-type lens shape, a planar shape or thin-film shape.

Performance of the light emitting diode may be further enhanced according to a method known in the art. A method of enhancing the performance may be a method of equipping a reflective layer or condensing layer of light on a back surface of a light emitting device, a method of forming a complementary color-tinted part on a lower portion, a method of equipping a layer for absorbing light having a shorter wavelength than a main emission peak on the light emitting device, a method of encapsulating the light emitting device and further molding the device using a hard material, a method of inserting the light emitting diode into a through hole and fixing the diode, or a method of extracting light from a direction of the substrate by connecting the light emitting device with a lead member through flip-chip connection.

The light emitting diode may be effectively applied to a backlight of a liquid crystal display (LCD), a lighting system, various kinds of sensors, a printer, a light source for a copy machine, etc., a light source for a dashboard of an automobile, a traffic light, an indicating lamp, a display device, a light source for a film heater, a display, decoration or various lights.

EFFECTS OF THE INVENTION

A curable composition, which can provide an encapsulating material, of which processibility and workability before curing may be effectively maintained and which exhibits excellent light transmissivity, light extraction efficiency, hardness, crack resistance, an adhesion strength and thermal shock resistance after curing, is provided.

Further, the curable composition may show effectively controlled tackiness in the surface and may not show whitening under the high temperature or high humidity condition before or after curing.

DETAILED DESCRIPTION OF EXEMPLARY EMBODIMENTS

Hereinafter, the curable composition will be described in detail with reference to Examples and Comparative Examples, but the scope thereof is not limited to the following examples.

In the specification, the mark "Vi" represent a vinyl group, the mark "Ph" represent a phenyl group, the mark "Me" represent a methyl group, and the mark "Ep" represent an epoxy group.

1. Evaluation of Surface Tackiness

A cured product of a curable composition is prepared by injecting the curable composition in a mold, and curing it at 150° C. for 1 hour. Then, the surface of the prepared cured product is touched by hand, and the surface tackiness thereof is evaluated according to the following criteria:

<Criteria for Evaluating Surface Tackiness>

O: When surface tackiness is not felt

Δ: When surface tackiness is slightly felt

X: When surface tackiness is extremely felt

2. Evaluation of Characteristics of Device

Characteristics of a device are evaluated using a 5630 LED package prepared by polyphthalate (PPA). A curable resin composition is dispensed in the PPA cup, left at 60° C. for 30 minutes, and cured at 150° C. for 1 hour, thereby manufacturing a surface-mounted LED. Afterward, thermal shock and long-term reliability under a high temperature and high humidity condition are evaluated under the following conditions.

<Criteria for Thermal Shock Evaluation>

One cycle, in which the surface-mounted LED is maintained at −40° C. for 30 minutes, and then further maintained at 100° C. for 30 minutes, is repeated ten cycles. Afterward, the surface-mounted LED was cooled at room temperature, and peeling of the LED is observed to evaluate thermal shock resistance (Total 10 surface-mounted LED's were prepared in each of Examples and Comparative Examples, and evaluated for a peeling state).

<Long-term Reliability Under High Temperature/High Humidity Condition>

The prepared surface-mounted LED is operated for 100 hours under constant conditions of a temperature of 85° C. and relative humidity of 85% while applying an electric current of 60 mA to the LED. After the completion of the operation, a brightness of the LED is then measured to calculate reduction in brightness with respect to the initial brightness, and the reliability is evaluated according to the following criteria.

<Evaluation Criteria>

O: When the reduction of the brightness relative to the initial brightness is 10% or less X: When the reduction of the brightness relative to the initial brightness is 10% or more

EXAMPLE 1

100 g of the (A) component represented by Formula A, which was prepared by a conventional method, was mixed with 100 g of the (B) component represented by Formula B and 55.0 g of the (C) component represented by Formula C, and 5.0 g of the tackifier represented by Formula D was mixed therewith. Subsequently, a catalyst (platinum(0)-1,3-divinyl-1,1,3,3-tetramethyldisiloxane) was mixed in such an amount that the mixture comprised 10 ppm of Pt (O), and then uniformly mixed together and defoamed, thereby preparing a curable composition.

$[ViMe_2SiO_{1/2}]_3[PhMeSiO_{2/2}]_{15}[PhSiO_{3/2}]_5[SiO_2]$ [Formula A]

$[ViMe_2SiO_{1/2}][ViMeSiO_{2/2}][PhMeSiO_{2/2}][PhSiO_{3/2}]_{10}$ [Formula B]

$[HMe_2SiO_{1/2}]_2[HMeSiO_{2/2}][Ph_2SiO_{2/2}]_2$ [Formula C]

$[ViMe_2SiO_{1/2}]_2[EpSiO_{3/2}]_2[PhMeSiO_{2/2}]_{10}$ [Formula D]

EXAMPLE 2

A curable composition was prepared by the same method as Example 1, except that 100 g of a compound represented by Formula E was used as the (A) component, and the amount of the (C) component represented by Formula C was changed into 40.0 g.

$[ViMe_2SiO_{1/2}]_2[PhMeSiO_{2/2}]_{14}[PhSiO_{3/2}]_4$ [Formula E]

EXAMPLE 3

A curable composition was prepared by the same method as Example 1, except that 100 g of a compound represented by Formula F was used as (A) component, and the content of the (C) component represented by Formula C was changed into 41.0 g.

$[ViMe_2SiO_{1/2}]_2[Me_2SiO_{2/2}]_7[Ph_2SiO_{2/2}]_{10}[PhSiO_{3/2}]$ [Formula F]

EXAMPLE 4

A curable composition was prepared by the same method as Example 1, except that 100 g of a compound represented by Formula G was used as (A) component, and the content of the (C) component represented by Formula C was changed into 46.0 g.

$[ViMe_2SiO_{1,2}]_2[ViMeSiO_{2/2}][Me_2SiO_{2/2}]_7[Ph_2SiO_{2/2}]_{10}[PhSiO_{3/2}]$ [Formula G]

COMPARATIVE EXAMPLE 1

A curable composition was prepared by the same method as Example 1, except that 100 g of a compound represented by Formula H was further blended without using the (A) component, and the content of the (C) component represented by Formula C was changed into 43.0 g.

$[ViMe_2SiO_{1/2}]_2[PhMeSiO_{2/2}]_{10}[PhSiO_{3/2}]_5[SiO_2]_3$

COMPARATIVE EXAMPLE 2

A curable composition was prepared by the same method as Example 2, except that the (B) component was not used, the content of the (C) component represented by Formula C was changed into 17.0 g, and the content of the tackifier represented by Formula D was changed into 2.5 g.

COMPARATIVE EXAMPLE 3

A curable composition was prepared by the same method as Example 1, except that the (A) component was not used, the content of the (C) component represented by Formula C was changed into 26.0 g, and the content of the tackifier represented by Formula D was changed into 2.5 g.

COMPARATIVE EXAMPLE 4

A curable composition was prepared by the same method as Example 1, except that the (B) component was not used, 100 g of the compound represented by Formula A as (A) component and 100 g of the compound represented by Formula E were used, and the content of the (C) component represented by Formula C was changed into 34.0 g.

COMPARATIVE EXAMPLE 5

A curable composition was prepared by the same method as Example 1, except that the (A) component was not used and 100 g of a compound represented by Formula I was further mixed.

$[ViMe_2SiO_{1/2}]_2[PhMeSiO_{2/2}]_6[PhSiO_{3/2}]_{14}$ [Formula I]

COMPARATIVE EXAMPLE 6

A curable composition was prepared by the same method as Example 1, except that the (B) component was not used and 100 g of a compound represented by Formula J was further mixed.

$[ViMe_2SiO_{1/2}]_2[PhMeSiO_{2/2}]_{20}$ [Formula J]

Compositions of the compositions prepared in Examples and Comparative Examples are summarized in Table 1. In Table 1, numbers indicate amounts of corresponding components used, but units of the numbers indicating the amount of a platinum catalyst are ppm of Pt(0), and units of the other numbers are all "g."

TABLE 1

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Component (A) | Formula A | 100 | — | — | — | — | — | — | 100 | | 100 |
| | Formula E | — | 100 | — | — | — | 100 | — | 100 | — | — |

TABLE 1-continued

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| | Formula F | — | — | 100 | — | — | — | — | — | — | — |
| | Formula G | — | — | — | 100 | — | — | — | — | — | — |
| Component (B) | Formula B | 100 | 100 | 100 | 100 | 100 | — | 100 | — | 100 | — |
| Component (C) | Formula C | 55 | 40 | 41 | 46 | 43 | 17 | 26 | 34 | 55 | 55 |
| Other Components | Formula D | 5.0 | 5.0 | 5.0 | 5.0 | 5.0 | 2.5 | 2.5 | 5.0 | 5.0 | 5.0 |
| | Formula H | — | — | — | — | 100 | — | — | — | — | — |
| | Formula I | — | — | — | — | — | — | — | — | 100 | — |
| | Formula J | — | — | — | — | — | — | — | — | — | 100 |
| Platinum Catalyst | | 10 | 10 | 10 | 10 | 10 | 10 | 10 | 10 | 10 | 10 |

The physical properties of each curable composition, evaluated by the disclosed methods, are summarized in Table 2.

TABLE 2

| | Surface Tackiness | Thermal shock | High Temperature/High Humidity Reliability |
|---|---|---|---|
| Example 1 | ○ | 1/10 | ○ |
| Example 2 | ○ | 1/10 | ○ |
| Example 3 | ○ | 0/10 | ○ |
| Example 4 | ○ | 1/10 | ○ |
| Comparative Example 1 | ○ | 10/10 | x |
| Comparative Example 2 | x | 10/10 | x |
| Comparative Example 3 | ○ | 10/10 | x |
| Comparative Example 4 | ○ | 10/10 | x |
| Comparative Example 5 | ○ | 10/10 | x |
| Comparative Example 6 | x | 9/10 | x |

As seen from the results in Table 2, the curable compositions in Examples had excellent physical properties measured.

It was confirmed that Comparative Example 1 was greatly decreased in the thermal shock and the long-term reliability under high temperature/high humidity condition, and Comparative Examples 2 to 6 were greatly decreased in at least two characteristics among the surface tackiness, the thermal shock and the long-term reliability under high temperature/high humidity.

What is claimed is:

1. A curable composition, comprising:

(A) a crosslinked polysiloxane that has an average composition formula of Formula 1;

(B) a crosslinked polysiloxane that has an average composition formula of Formula 2; and (C) a polysiloxane that has at least one hydrogen atom bound to the silicon atom:

$$(R^1R^2R^3SiO_{1/2})_a(R^4R^5SiO_{2/2})_b(R_6SiO_{3/2})_c(SiO_{4/2})_d \quad \text{[Formula 1]}$$

$$(R^7R^8R^9SiO_{1/2})_e(R^{10}R^{11}SiO_{2/2})_f(R^{12}SiO_{3/2})_g(SiO_{4/2})_h \quad \text{[Formula 2]}$$

wherein $R^1$ to $R^{12}$ are independently an alkoxy group having 1 to 20 carbon atoms, a hydroxyl group, an epoxy group, an alkyl group having 1 to 20 carbon atoms, an alkenyl group having 2 to 20 carbon atoms or an aryl group having 6 to 25 carbon atoms, provided that at least one of $R^1$ to $R^6$ and at least one of $R^7$ to $R^{12}$ are the alkenyl groups having 2 to 20 carbon atoms, (a+b)/(a+b+c+d) is in the range from 0.7 to 0.97, c/(c+d) is in the range of 0.8 or more, (e+f)/(e+f+g+h) is in the range from 0.2 to 0.7, g/(g+h) is in the range of 0.7 or more, c and d are not 0 simultaneously, g and h are not 0 simultaneously, and provided that when the sum of variables (a+b+c+d) in Formula 1 is 1, variable "a" is in the range from 0 to 0.5, variable "b" is in the range from 0.5 to 0.98, variable "c" is in the range from 0 to 0.2, and variable "d" is in the range from 0 to 0.1.

2. The curable composition according to claim 1, wherein a molar ratio of the total alkenyl group(s) having 2 to 20 carbon atoms in the (A) polysiloxane with respect to the total silicon atoms in the (A) polysiloxane is in the range from 0.02 to 0.2.

3. The curable composition according to claim 1, wherein the (A) polysiloxane comprises at least one unit selected from the group consisting of a $[R^{13}R^{14}sio_{2/2}]$ unit, a $[R^{14}{}_2Si_{O2/2}]$ unit and a $[R^{14}SiO_{3/2}]$ unit, where $R^{13}$ is an alkyl group having 1 to 20 carbon atoms and $R^{14}$ is an aryl group having 6 to 25 carbon atoms.

4. The curable composition according to claim 1, wherein the (A) polysiloxane comprises a $[R^{13}{}_2SiO_{2/2}]$unit and a $[R^{14}{}_2SiO_{2/2}]$ unit, where $R^{13}$ is an alkyl group having 1 to 20 carbon atoms and $R^{14}$ is an aryl group having 6 to 25 carbon atoms.

5. The curable composition according to claim 1, wherein (a+b)/(a+b+c+d) in Formula 1 is in the range from 0.75 to 0.97.

6. The curable composition according to claim 1, wherein the (A) polysiloxane is a reaction product of a mixture comprising a compound of Formula 3 and a cyclic siloxane compound of Formula 4:

[Formula 3]

$$(R^aR^b{}_2Si)_2O$$

[Formula 4]

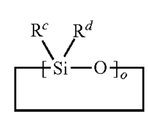

wherein $R^a$ to $R^d$ are independently an alkoxy group having 1 to 20 carbon atoms, a hydroxyl group, an epoxy group, an alkyl group having 1 to 20 carbon atoms, an alkenyl group having 2 to 20 carbon atoms or an aryl group having 6 to 25 carbon atoms, provided that at least one of $R^a$ to $R^d$ is the alkenyl group having 2 to 20 carbon atoms, and o is in the range from 3 to 6.

7. The curable composition according to claim 6, wherein the mixture further comprises polysiloxane represented by Formula 6 or 7 :

$$[R^eSiO_{3/2}] \quad \text{[Formula 6]}$$

$$[R^aR^b{}_2SiO_{1/2}]_p[R^eSiO_{3/2}]_q \quad \text{[Formula 7]}$$

wherein $R^a$, $R^b$ and $R^e$ are independently an alkoxy group having 1 to 20 carbon atoms, a hydroxyl group, an epoxy group, an alkyl group having 1 to 20 carbon atoms, an alkenyl group having 2 to 20 carbon atoms or an aryl group having 6 to 25 carbon atoms, p is in the range from 1 to 2, and q is in the range from 3 to 10.

8. The curable composition according to claim 1, wherein a molar ratio of the total alkenyl group(s) in the (B) polysiloxane with respect to the total silicon atoms in the (B) polysiloxane is in the range from 0.05 to 0.35.

9. The curable composition according to claim 1, wherein the (B) polysiloxane comprises at least one unit selected from the group consisting of a ($R^{13}R^{14}SiO_{2/2}$) unit, a ($R^{14}{}_2$Si2/2) unit and a ($R^{14}SiO_{3/2}$) unit, where $R^{13}$ is an alkyl group having 1 to 20 carbon atoms, and $R^{14}$ is an aryl group having 6 to 25 carbon atoms.

10. The curable composition according to claim 1, wherein the (e+f)/(e+f+g+h) in Formula 2 is in the range from 0.2 to 0.5.

11. The curable composition according to claim 1, wherein the (B) polysiloxane is comprised in an amount of 20 to 700 parts by weight, relative to 100 parts by weight of the (A) polysiloxane.

12. The curable composition according to claim 1, wherein a molar ratio of the total hydrogen atom(s) bound to the silicon atom(s) in the (C) polysiloxane with respect to the total silicon atoms in the (C) polysiloxane is in the range from 0.2 to 0.8.

13. The curable composition according to claim 1, wherein the (C) hydrogen polysiloxane is represented by Formula 8 :

[Formula 8]

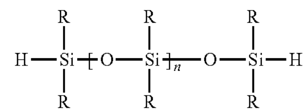

wherein R's are independently a hydrogen atom, an epoxy group, an alkyl group having 1 to 20 carbon atoms, an alkenyl group having 2 to 20 carbon atoms or an aryl group having 6 to 25 carbon atoms, and n is in the range from 1 to 10.

14. The curable composition according to claim 1, wherein a molar ratio of the total hydrogen atom(s) bound to the silicon atom(s) in the (C) polysiloxane with respect to the total alkenyl groups in the (A) polysiloxane and (B) polysiloxane is in the range from 0.7 to 1.3.

15. The curable composition according to claim 1, wherein the (A), (B) and (C) polysiloxanes satisfy the requirements of Expressions 1 and 2:

$$|X_{(A)}-X_{(B)}|<0.5 \quad \text{[Expression 1 ]}$$

$$|X_{(B)}-X_{(c)}|<0.5 \quad \text{[Expression 2]}$$

wherein $X_{(A)}$ is a molar ratio of the total aryl group(s) having 6 to 25 carbon atoms in the (A) polysiloxane with respect to the total silicon atoms in the (A) polysiloxane, $X_{(B)}$ is a molar ratio of the total aryl group(s) having 6 to 25 carbon atoms in the (B) polysiloxane with respect to the total silicon atoms in the (B) polysiloxane, and $X_{(c)}$ is a molar ratio of the total aryl group(s) having 6 to 25 carbon atoms in the (C) polysiloxane with respect to the total silicon atoms in the (C) polysiloxane.

16. A semiconductor device which comprises a semiconductor element encapsulated with an encapsulating material comprising the curable composition of claim 1 in the cured state.

17. A light emitting device which comprises a light emitting diode encapsulated with an encapsulating material comprising the curable composition of claim 1 in the cured state.

18. A liquid crystal display which comprises the light emitting device of claim 17 in a backlight unit.

19. A lighting comprising the light emitting device of claim 17.

* * * * *